United States Patent
Schweikert

(10) Patent No.: US 6,919,506 B2
(45) Date of Patent: Jul. 19, 2005

(54) DEVICE FOR FASTENING AN ELECTRICAL COMPONENT ON A MOUNTING BOARD

(75) Inventor: Wilhelm Schweikert, Heidenheim (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 10/484,481

(22) PCT Filed: Jun. 27, 2002

(86) PCT No.: PCT/DE02/02346

§ 371 (c)(1),
(2), (4) Date: Feb. 5, 2004

(87) PCT Pub. No.: WO03/017298

PCT Pub. Date: Feb. 27, 2003

(65) Prior Publication Data

US 2004/0185711 A1 Sep. 23, 2004

(30) Foreign Application Priority Data

Aug. 10, 2001 (DE) .......................... 101 39 390

(51) Int. Cl.$^7$ .............................. H05K 5/00; H02G 3/08
(52) U.S. Cl. ...................... 174/52.1; 361/809; 361/811
(58) Field of Search .................. 174/52.1; 361/807, 361/808, 809, 810, 811

(56) References Cited

U.S. PATENT DOCUMENTS

| | | | |
|---|---|---|---|
| 2,701,866 A | | 2/1955 | Chapman |
| 2,710,866 A | | 2/1955 | Caprara et al. |
| 3,590,137 A | * | 6/1971 | Librandi ........................ 174/58 |
| 4,153,310 A | * | 5/1979 | Loving et al. ............... 312/100 |
| 4,424,626 A | * | 1/1984 | Pennington ................... 29/839 |
| 4,584,630 A | * | 4/1986 | Rubin ......................... 361/513 |
| 5,642,266 A | * | 6/1997 | McCartney .................. 361/809 |
| 6,262,367 B1 | * | 7/2001 | Correa ....................... 174/52.1 |
| 6,265,661 B1 | | 7/2001 | Schweikert et al. |
| 6,300,564 B1 | * | 10/2001 | Moraes et al. .............. 174/52.1 |
| 6,717,797 B1 | * | 4/2004 | Martin et al. ................ 361/601 |
| 2002/0153153 A1 | * | 10/2002 | Jakob et al. ................ 174/52.1 |

FOREIGN PATENT DOCUMENTS

| | | |
|---|---|---|
| AT | 397333 | 3/1994 |
| DE | 1 848 945 | 3/1962 |
| DE | 1200912 | 9/1965 |
| DE | 1848945 | 1/1966 |
| DE | 3834590 | 4/1990 |
| DE | 4038689 | 6/1992 |
| DE | 4426087 | 1/1996 |
| DE | 19723455 | 6/1997 |
| GB | 1016506 | 1/1996 |

* cited by examiner

*Primary Examiner*—Hung V. Ngo
(74) *Attorney, Agent, or Firm*—Fish & Richardson P.C.

(57) ABSTRACT

A device for fastening an electrical component to a mounting board includes a sleeve that at least partially surrounds the electrical component, and a tensioning device that is separate from the sleeve and that holds the electrical component in the sleeve. The tensioning device is positioned around a circumference of the sleeve.

15 Claims, 2 Drawing Sheets

DEVICE FOR FASTENING AN ELECTRICAL COMPONENT ON A MOUNTING BOARD

BACKGROUND

In order to attach electric components, such as aluminum electrolyte capacitors to mounting boards for use in capacitor batteries, cylindrical capacitors are often attached on the circumference of the capacitor. In this case, a housing of the capacitor is attached to the mounting board by ring clamps. With this known ring-clamp attachment, the housing is fixed in the ring clamp via tension screws and nuts, and the ring clamp itself is then screwed onto a mounting board. This method of attaching a capacitor via the housing covering is problematic, however, since its wall strengths are very low, in general, and the material consists of relatively soft aluminum, so it cannot receive any large forces.

In patent document DE 197 23 455 C1, attachment of capacitors to mounting boards without applying large tension forces to the housing is disclosed. In this case, the ring clamp, which can consist of plastic, forms a part with a conic shape that attaches the capacitor housing to the ring clamp and directs the tension forces to the mounting board. The ring clamp is firmly attached to the mounting board in this case. The disadvantage of this construction is that this plastic ring clamp not only attaches the capacitor to the mounting board, but also attaches it via tension forces through the conic parts. However, plastic molded parts are suitable only for attaching electric components under certain conditions; they cannot apply any high-tension force, and, in addition, they can succumb to tension force rapidly because of material fatigue.

Devices are known from printed documents DE 4426087 A1, DE 1848945 U, DE 1200912 A, DE 4038689 A1, AT 397333 B, and U.S. Pat. No. 2,701,866 for attaching electric components, in which the function of the place determination of the component on the mounting board and the attachment and tension are integrated into a single device. The disadvantage of these devices is that, in the case of flexible tensioning devices, e.g., of plastic, material fatigue is possible, or, in the case of metallic tensioning devices, large forces act on the fixed component.

A flexible holder for attaching a ring core to a bearing part is known from printed document DE 38 34 590 A1, which has two flaps on the circumference of the ring core. A separate cable binder that passes through the hole in the middle of the ring core and the flaps on it are pulled and attached to the ring core in the holder. Since the ring core and, correspondingly, also the holder have another geometry than the housing of many cylindrical electrical components, e.g., electrolyte capacitors, this holder is not suitable as an attachment device for a number of components.

SUMMARY

The goal of the present invention is to provide an attachment for components that makes possible a permanent attachment that is not affected by material fatigue without simultaneously applying large forces to the component.

This task is solved by the invention of Claim 1. Advantageous embodiments of the invention are the subject of additional subclaims.

In contrast to the state of the art, in the present invention, the function of place determination of the electrical component on the mounting board is separated from the function of tension and attachment of the component on the mounting board. According to the invention, this is achieved by attaching a deformable sleeve to the mounting board, which can enclose the electrical component at least partially and thus determines the position of the component on the mounting board. Then, the electric component is attached with a tensioning device inside the sleeve and, as such, it is firmly attached to the mounting board. The tensioning device encloses the sleeve and the component inside it on the circumference. The deformable sleeve and tensioning device are thus two separate components, the geometry and material characteristics of which are determined by their particular functions. While the material of the sleeve is deformable, the tensioning device consists of a material that it capable of building-up sufficient tension with a material fatigue that would affect the attachment. The tensioning device is oriented toward the electric component in such a way that a maximum tension force can develop. This is the case, as a rule, only when the tensioning device surrounds the sleeve and the electrical component inside it on its circumference.

The deformable sleeve attached to the mounting board thereby attaches the electrical component only loosely to the mounting board. When the electrical component is firmly attached to the deformable sleeve with the aid of the tensioning device, the material of the sleeve leads the tension force further only as a compression force does and it is not subjected to bending or stretching. Because of this, no rapid material fatigue from the sleeve has to be taken into account. At the same time, the deformable sleeve distributes the tension force of the tensioning device uniformly over the housing of the electrical component so that it is not subjected to any large tension forces.

The attachment device according to the invention serves to attach and fix components with cylindrical housings. In this case, advantageously, the deformable sleeve and/or the tensioning device can surround the component over its entire circumference so that an especially firm attachment results. Cylindrical housings in this context mean housings with spatial extensions along three main axes, whereby the extensions along these three main axes can be different (square or rectangular components). The circumference of these components is defined by two main axes.

Advantageously, the deformable sleeve consists of a slightly extendable thermoplastic plastic, such as polypropylene or polyamide. In order to increase the deformability of the sleeve somewhat, slits can be provided in the sleeve, which are arranged perpendicular to the board. The cross-section of the deformable sleeve is adjusted to the cross-section of the electrical component to be attached, and it can be, for example, round, oval, or even polygonal. The deformable sleeve can be implemented in such a way that it is closed on its side pointing downward and only has an opening upward, so that the electrical component is additionally supported by the bottom of the deformable sleeve.

For the tensioning device, a suitable material is, for example, a metal strip or highly solid cable binder, such as polyamide. Like deformable sleeves, the cross-section of the tensioning device can be adjusted in its shape to the cross-section of the component to be attached, so that cable binders with round, oval, or even polygonal shape or metal strips can result, depending on the shape of the electrical component.

In the following, the invention will be explained further on the basis of an embodiment example and two diagrams.

DETAILED DESCRIPTION

Figure 1:
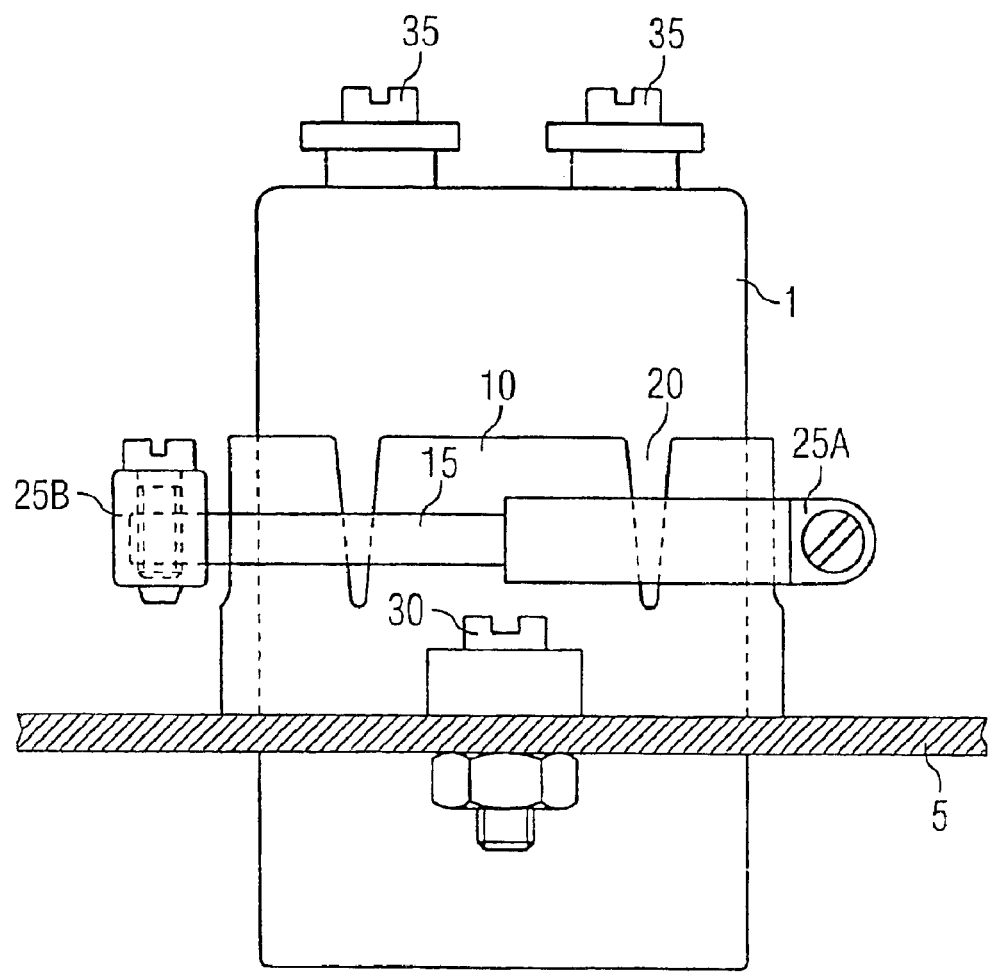
FIG. 1 shows a capacitor attached to a mounting board in a side view.

In FIG. 1, an electrical component 1, in this case a capacitor with a capacitor housing, is shown, on which connections 35 are arranged. The capacitor plugs into a deformable sleeve 10, which is attached to the mounting board 5 with a screw 30, and applied to the assembly board in this manner. Alternatively, the deformable sleeve can also be riveted to the mounting plate. The sleeve, in this case, surrounds the capacitor over its entire circumference so that an especially good attachment to the mounting board results.

The mounting board can consist, for example, of a platinum, lead, or plastic part. In order to assure deformability of the sleeve 10, slits 20 are also arranged in sleeve 10. A tensioning device 15 is then provided that encloses the sleeve with the capacitor arranged in it, e.g., a hose strip that can have either vertical tension screws 25B or horizontal tension screws 25A. The hose strip fixes the capacitor inside the deformable sleeve, which in turn distributes the tension forces of the hose trip uniformly over the capacitor housing.

Another advantage of the device according to the invention results because tensions on the electrical component 1 in the deformable sleeve 10 can balance dimension tolerances. The region of tolerance balancing is determined by the deformability of the sleeve and by the strength of the tension in the sleeve.

Figure 2:
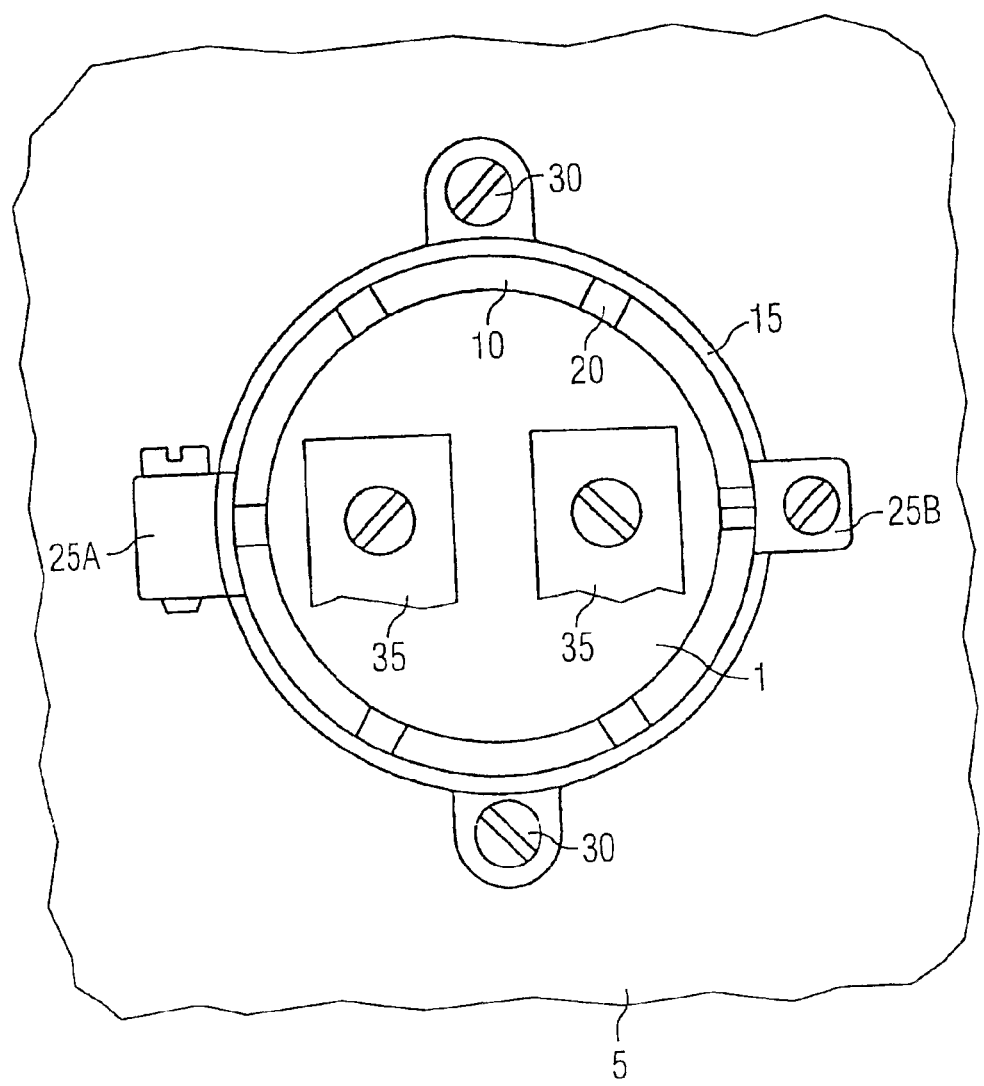
FIG. 2 shows a top view of the capacitor shown in FIG. 1.

In FIG. 2, a top view of the device according to the invention is shown with the capacitor. It can be seen that the deformable sleeve 10 is attached by one or more screws 30 provided near the opening for the component on the mounting board 5. The capacitor is fixed by the tensioning device 15 with the tension screws 25A and 25B in the deformable sleeve, whereby the tensioning device surrounds the capacitor especially firmly over its entire circumference.

The invention is not limited to the embodiment described above. Within the framework of the invention, other variants are obviously possible, especially with regard to the materials used for the deformable sleeve and the tensioning device, the precise design of the sleeve, and also the type of the tension, for example with the aid of tension screws or devices similar to cable binders.

What is claimed is:

1. A device for fastening an electrical component to a mounting board, the device comprising:
   a sleeve that at least partially surrounds the electrical component; and
   a tensioning device that is separate from the sleeve and that holds the electrical component in the sleeve, the tensioning device being positioned around a circumference of the sleeve.

2. The device of claim 1, wherein the sleeve is adjustable to fit around the electrical component.

3. The device of claim 1, wherein the sleeve includes slits.

4. The device of claim 3, wherein the slits are substantially perpendicular to the mounting board.

5. The device of claim 1, wherein the sleeve is comprised of a thermoplastic plastic.

6. The device of claim 1, wherein the sleeve is comprised of polypropylene or polyamide.

7. The device of claim 1, wherein a cross-section of the tensioning device (15) is adjustable to fit a cross-section of the sleeve surrounding the electrical component.

8. The device of claim 1, wherein the tensioning device includes at least one of a tube shell, a hose binder, and a cable binder.

9. An apparatus for use in fastening an electrical component to a mounting board, the apparatus comprising:
   holding means for holding the electrical component, the holding means containing a mechanism to fix the holding means to the mounting board; and
   tightening means for tightening the holding means around the electrical component.

10. The apparatus of claim 9, wherein the electrical component comprises a capacitor.

11. The apparatus of claim 9, wherein the mechanism comprises at least one screw.

12. The apparatus of claim 9, wherein the holding means comprises a deformable sleeve containing one or more slits therethrough.

13. The apparatus of claim 9, wherein the tightening means comprises a strip disposed around a circumference of the holding means, and one or more tension screws, the tension screws being operable to tighten the strip around the holding means.

14. An apparatus to fasten an electrical component to a mounting board, the apparatus comprising:
   a deformable sleeve that holds the electrical component, the deformable sleeve having strips therethrough which are substantially vertical relative to the mounting board;
   a strip disposed around the deformable sleeve;
   tension screws that interact with the strip in order to tighten the strip around the deformable sleeve; and
   a screw that fixes the deformable sleeve to the mounting board.

15. The apparatus of claim 14, wherein the electrical component comprises a capacitor.

* * * * *